July 29, 1958  F. J. MORLEY, JR., ET AL  2,845,524
ARC WELDING APPARATUS
Filed Nov. 30, 1955  3 Sheets-Sheet 1

WITNESSES
Edwin E. Bassler
Leon M. Garman

INVENTORS
Fred J. Morley, Jr., Louis Manno
& Austin Dixon
BY
Hymen Diamond
ATTORNEY

United States Patent Office 2,845,524
Patented July 29, 1958

2,845,524

ARC WELDING APPARATUS

Fred J. Morley, Jr., Hempfield Township, Westmoreland County, Louis Manno, Wilkinsburg, and Austin Dixon, Westmoreland City, Pa., assignors to Westinghouse Electric Corporation, East Pittsburgh, Pa., a corporation of Pennsylvania Application November 30, 1955, Serial No. 550,105

6 Claims. (Cl. 219—130)

This application relates to arc welding apparatus and has particular relation to arc-spot-welding apparatus.

Arc-spot welding is used in the joining of structural parts over substantial lengths, particularly where it is not necessary that the joint be gas tight. Arc-spot welding may also be used in the tacking of parts preparatory to joining them with a weld of another type, as for example a seam (arc) or continuous weld. The predominant practice in accordance with the teaching of the prior art has been to produce arc-spot welds by welding with a non-consumable electrode, such as one of tungsten without a filler. In welding of this type the joint is made by fusing the parent metal of the parts to be joined. But non-consumable electrode arc-spot welding has disadvantages. Among its important disadvantages are that it does not lend itself to the welding of scaly materials and it presents difficulties or limitations in the welding of materials of substantial thicknesses.

It is accordingly an object of this invention to provide arc-spot welding apparatus having substantially wider applicability than the non-consumable electrode arc-spot welding and which shall be particularly suitable for welding with scaly material such as a scaly steel and for the welding of materials over a wide range of thicknesses.

In accordance with this invention in its broader aspects, apparatus for arc-spot welding with a consumable electrode in an inert or other non-reactive gas shield is provided. In welding with apparatus of this type the joints are made by depositing fused consumable electrode material. Two important categories of arc-spot welds produced in this way are the straight fusion weld and plug weld. The straight fusion weld is a weld produced by building up the filler material on the surface of one of the parts to be welded. During the building up process the surface in the region where the filler is being built up is melted and fusion takes place between the surface and the filler. The plug weld is a weld in which the arc is concentrated over a hole in the parts to be welded and the filler is deposited in the hole. The plug weld is to be preferred to the straight fusion weld in situations where it is undesirable that the welding material extend above the surface being welded or as a replacement of fillet or continuous (seam) welds.

In the making of plug welds and to a certain extent in the making of straight fusion welds, it is essential that the quantity of material deposited be maintained within reasonable limits, and it is an object of this invention to provide arc-spot welding apparatus including timing means for timing the welding operation from the instant when the arc is started to the instant when the arc is extinguished.

Since the welding is carried out with a consumable electrode in a shielding atmosphere and with a cooling liquid flowing through the gun, the control of the electrode consumption is intimately tied in with the control of the shielding gas and the cooling liquid for the nozzle and it is essential that this tie-in be closely controlled. It is then a specific object of this invention to provide a control for arc-spot welding apparatus in which the supply of the shielding gas, the supply of the cooling water and the consumption of the welding electrode shall be precisely coordinated to produce sound welds.

In accordance with this invention, apparatus for arc welding with a consumable electrode in a shielding gas including a novel gun and a control are provided. The gun is a modification of the gun disclosed in application Ser. No. 465,508, filed October 29, 1954, to Joseph F. Miller (herein called Miller gun). The spot welding gun according to this invention differs from the Miller gun in that the former includes an adapter for arc-spot welding which either replaces the nozzle of the Miller gun or, in situations in which the welding is such that there is not substantial heating, slips over the nozzle of the Miller gun. This adapter is secured to the extension of the Miller gun and is provided with a cavity through which cooling fluid may be transmitted. The joint between the adapter and the extension of the Miller gun is such that the channel of the Miller gun through which the cooling fluid is transmitted is in communication with the cooling cavity within the adapter. The adapter has a tip which has a structure in conformity with the welding of the type which is to be carried out.

In the use of the control in accordance with this invention the welding apparatus passes through a complete cycle in producing each spot weld. First there is a so-called pre-purge operation, that is, shielding gas is supplied to the spot to be welded and cooling water supplied to the gun before the actual welding starts; then the arc is fired and the welding electrode material is deposited; then there is so-called burn back, that is, the electrode is melted back from the weld; and finally there is a post-purge operation, that is, shielding gas is supplied to the spot of the weld and water to the gun for a certain time interval after the melting of the electrode material is terminated. The pre-purge is essential to flush out the air from the gas channels of the gun, clear the surface of the work of air and prepare an adequate shield for the arc before the arc is actually fired. This insures metalurgically sound welds. The post-purge is important to provide a shield to prevent oxidation of molten material at the weld after the arc has been interrupted. Post-purge is particularly essential in welding stainless steel or in welding with a stainless steel consumable electrode. The burn back is necessary to prevent the electrode from sticking to the pool.

An important feature of this invention in its specific aspects is that the pre-purge is effected by initiating the supply of shielding gas simultaneously with the initiation of the movement of the electrode toward the work. The pre-purge interval is then the interval during which the electrode is moving from a position within the nozzle of the welding gun to the work. The burn back between welds should then consume sufficient electrode material to make available sufficient time for pre-purge. The post-purge is effected by providing the control with timing means which introduces a time delay between the termination of the movement of the welding electrode and the closing of the shielding gas valve. The burn back is effected by timing means which introduces a delay between the stopping of the movement of the electrode and the interruption of the supply of electrical power between the electrode and the work.

The novel features considered characteristic of this invention are discussed generally above. The invention itself, both as to its organization and its method of operation, together with additional objects and advantages thereof, will be understood from the following description of specific embodiments when read in connection with the accompanying drawings, in which.

Figure 1:
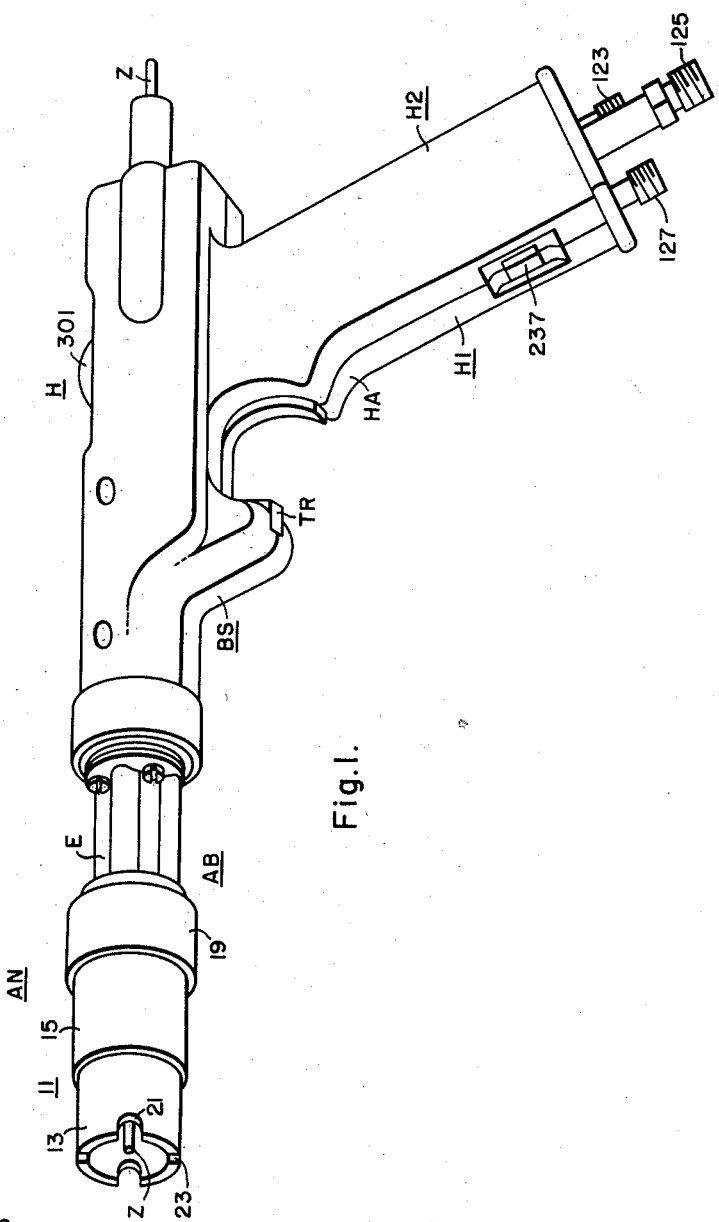
Figure 1 is a view in perspective of a gun in accordance with this invention.
Figure 8:
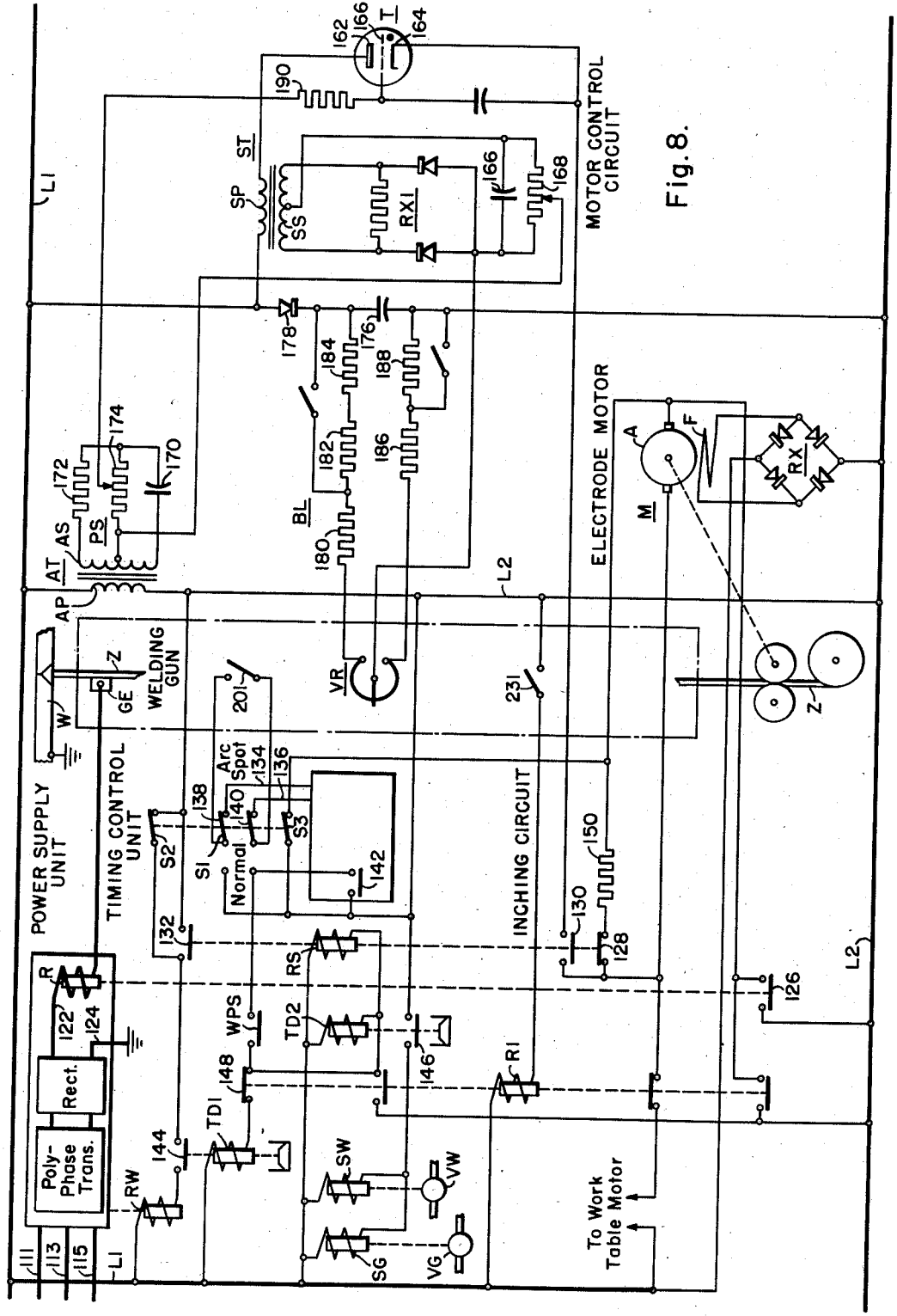
Fig. 8 is a circuit diagram of a control in accordance with the specific aspect of this invention.

The gun shown in Fig. 1 includes a barrel AB, a handle HA and butt portion H. The barrel includes an adapter nozzle unit AN and extension E. The extension E, the butt portion H and the handle HA are identical to and cooperate in the same manner as the corresponding components of the Miller gun. As in the Miller gun, the handle HA is provided with a trigger TR for actuating a switch to start the operation of apparatus with which the gun is used and an inching trigger 237. Within the butt portion HA there is a variable resistor VR (Fig. 8) connected to control the speed of the motor M (Fig. 8) which drives the electrode. This variable resistor is actuable by a knurled disc 301.

Figure 7:
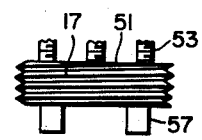
Fig. 7 is a view in side elevation of a spacer of a gun in accordance with this invention.

The adapter unit AN includes a nozzle 11 having a tip 13 and a body 15, a threaded spacer 17 (Fig. 7) for joining the nozzle to the extension E and a knurled ring 19 for holding the nozzle and spacer together. For the different types of welding nozzles with different tips are provided.

Figure 6:
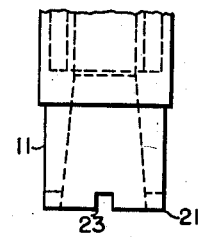
Fig. 6 is a view in side elevation of the nozzle in accordance with this invention which is on the gun shown in Fig. 1 and which is particularly suitable for producing straight or plug welds of lap joints on flat surfaces.

The nozzle 11 shown in Fig. 1 (and Fig. 6) is suitable for plug welding of lap joints. The tip 13 of this nozzle 11 is of generally circular cross section having a circular end so that it may be readily disposed in contact with the adjacent surface of the parts to be joined. A plurality of pairs of semi-circular notches or ports 21 and 23 extend into the tip 13. The notches of each pair are diametrically opposite, each of the pair 21 being circular and each of the pair 23 being rectangular. The diameters of the nozzle passing through the centers of the bases of the notches 21 are at right angles to the corresponding diameter for the other notches. The notches 23 are aligned along the weld and the notches 21 serve as port holes.

Figure 2:
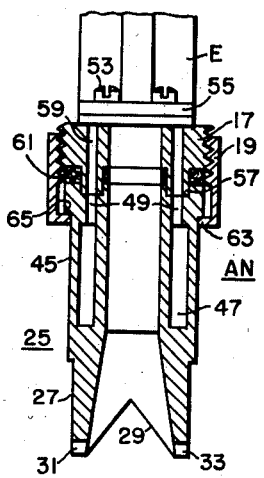
Fig. 2 is a view in section of an adapter nozzle in accordance with this invention particularly suitable for producing straight fusion welds in the making of outside or corner joints.
Figure 3:
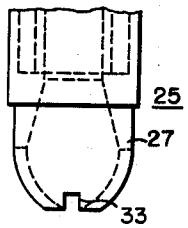
Fig. 3 is a fragmental view in side elevation of the nozzle shown in Fig. 2.

The nozzle 25 shown in Figs. 2 and 3 includes a tip 27, particularly suitable for welding outside or corner joints. The tip 27 of the nozzle 25 has diametrically disposed V-shaped openings 29 diverging from one of its longitudinal central planes to its end 31 and diametrically opposite notches 33, the longitudinal center lines of which define a plane at right angles to the above-mentioned central plane. The V-shaped openings 29 fit over the corner joints and the notches 33 serve to permit escape of gas.

Figure 4:
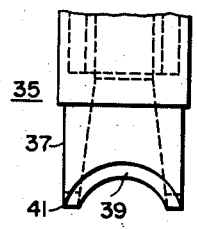
Fig. 4 is a fragmental view in side elevation of an adapter nozzle particularly suitable for producing fillet joints such as T-joints and butt joints.
Figure 5:
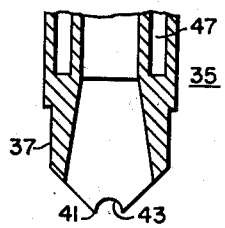
Fig. 5 is a fragmental view in section of a nozzle shown in Fig. 4.

The nozzle 35 shown in Figs. 4 and 5 is suitable for fillet welding. This nozzle includes a tip 37 having diametrically opposite arc shaped openings 39 extending from its end 41. These arc shaped openings terminate at the end 41 about a longitudinal diametral plane and diametrically disposed notches 43 extend between the edges of the openings 39. The openings 39 engage the surfaces of the parts to be welded about the region of the weld and the openings 43 serve as ports.

The nozzle body 15 (Fig. 1), 45 (Fig. 2) is the same for all nozzles. It includes a hollow space or cavity 47 from which a plurality of openings 49 to the edge remote from the tip extend.

The spacer 17 is externally threaded and is provided with tapped openings in one of its faces 51 where it may be engaged by screws 53 extending through a flange 55 in the extension E and is thus secured to the extension. The spacer 17 is also provided on its opposite face with tubulations 57 which extend from longitudinal openings 59 passing through the spacer. When the spacer is mounted on the extension E two of these openings 59 communicate with the openings in the extension E through which the cooling fluid is transmitted, (see Miller application) and the corresponding tubulations 57 extend into openings 49 in the nozzle 25. Thus the cooling fluid transmission channels in the extension E and in the remainder of the gun communicate with the cooling cavity 47 within the body portion 45 of the nozzle.

The body portion 45 of the nozzle 25 is separated from the spacer 17 by a gasket 61 which is penetrated by the tubulations. The nozzle 25 and the gasket 61 are held tightly to the spacer 17, which is in turn secured to the extension E, by a knurled holding ring 19 which has threads that engage the outside threads on the spacer. The ring 19 is provided with a lip 63 which engages a shoulder 65 extending from the body portion 25 of the nozzle portion when the ring is screwed into place.

In the use of the gun the water inlet supply is connected to fitting 123, the water outlet to fitting 125 and the gas inlet to fitting 127. Cooling water when supplied then flows through the cavity 47 to cool the nozzle and gas flows through the nozzle when it is supplied. An electrode Z is supplied through the butt H of the gun passing through a guide tube GE (shown in Miller application) within the gun which serves to connect the power supply to the electrode Z.

Figure 9:
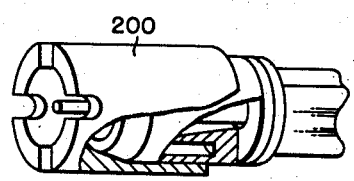
Fig. 9 is a fragmental view in perspective showing a modification of a gun in accordance with this invention.

While Figs. 1 through 7 disclose adapter nozzles of the type secured to the extension E in place of the nozzle ordinarily provided, the adapter nozzle may be of the slip-on type as shown at 200 in Fig. 9. Such nozzles are usually made so that they may be slipped over the ordinary nozzles and frictionally secured thereto. Such nozzles are cooled only indirectly from the ordinary nozzle but for many purposes this cooling is adequate since the arc-spot welds are short.

The control apparatus is a modification of the apparatus disclosed in application Serial No. 465,600, filed October 29, 1954, to Harry J. Bichsel and Alfred Baeslack (herein called Bichsel-Baeslack application) and this application is incorporated herein by reference. The control apparatus includes a timing control unit, an electrode motor and a motor control unit and is connected as shown to a welding gun of the type shown in Figs. 1 through 7 and to a power supply unit. The welding gun is shown symbolically. This apparatus may be used for ordinary welding as well as for arc-spot welding and may be set for either one or the other by setting a plurality of switches S1, S2 and S3 in one position or the other as indicated. The switches may preferably be ganged but where ganged switches are unavailable, separately actuable switches may be used. The present invention concerns itself with arc-spot welding and the apparatus need only be considered with the switches S1, S2 and S3 set for arc-spot welding. The switches are shown in this setting.

As is stated in the Bichsel-Baeslack application, the power supply unit is of the three phase type disclosed in application Serial No. 429,932, filed May 14, 1954, to Harry Bichsel (herein called Bichsel application). This unit is supplied with power from busses or conductors 111, 113 and 115. The apparatus which controls the operation of the various parts of the welding apparatus is supplied with power from conductors L1 and L2 which may derive their power from two of the conductors 111, 113 and 115 through suitable transformers (not shown).

The power supply unit includes a polyphase transformer and a rectifier connected and constructed as disclosed in the Bichsel application. The rectifier has output terminals 122 and 124 from which the power for welding is derived. Output conductor 122 is connected to the guide tube GE in the welding gun through the coil of a current relay R which is actuated when welding current flows. The connection to the tube GE is usually through the water outlet fitting 123 (Fig. 1). The contact 126 of this relay R is shunted out by switch S3 with the apparatus set for arc-spot welding and this relay is not involved in the operation of this invention. The timing control unit includes a starting relay RS, a timer for timing the interval during which the electrode motor is energized, a time delay relay TD1 and a time delay relay TD2. The starting relay RS includes a normally closed contact 128 and a pair of normally open contacts 130 and 132. Contact 132 is shunted out by switch S2 with the unit set for arc-spot welding. The timer may be any of the numerous timing devices available in the art which operate to close or open a circuit during a time interval measured with reasonable precision. A preferred timer is the Westinghouse 1A Timer, Style No. 1501404. A timing operation of this timer is started when its starting circuit is closed. In the practice of this invention the conductors 134 and 136 through which this starting circuit is closed are connected across the trigger switch 201 of the welding gun through the contacts 138 and 140 of switch S1. When a timing operation of the timer is started a contact 142 in the timer is closed. This contact remains closed during the timing operation of the Timer and opens at the end of the timing operation.

The timing relays TD1 and TD2 each have a normally open contact 144 and 146 respectively which closes immediately on energization of each relay and opens only after a predetermined time interval after the supply of current of the coil of the relay is interrupted. Any relay available in the art may be used, but in accordance with the preferred practice of this invention the relay used is Class 9050, Type RO–13D, 110 volt, A. C. timing relay sold by Square D. Relay TD1 times a timing interval of about one-quarter to one-half a second and the TD2 times a timing interval of about 6 seconds.

The timing control unit also includes solenoids SG and SW for controlling the shielding gas valve VG and the cooling fluid valve VW, respectively. These valves VG and VW control the flow of gas through fitting 125 and water through fitting 121 (see Fig. 1). Further, the unit includes an inching relay RI which is not used in arc-spot welding.

The coil of relay RW is adapted to be connected between the conductors L1 and L2 through the normally open contact of the relay TD1 and switch S2. The coil of relay TD1 is adapted to be connected between the conductors L1 and L2 through the normally closed contacts 148 of relay R1, a pressure switch WPS which is closed when the water or cooling fluid pressure is adequate, and the contact 142 of the timer. The coil of the relay TD2 is adapted to be connected between the conductors L1 and L2 through the water pressure switch WPS and the contact 142 of the timer. The solenoids SG and SW are adapted to be connected between the conductors L1 and L2 through the normally open contacts 146 of relay TD2.

The electrode motor M is of the type described in the Bichsel-Baeslack application and the applications to which it refers. This motor includes a rotor A and a shunt field winding F. The shunt field winding is supplied through a rectifier RX from the conductors L1 and L2. The rotor A is in the stand-by condition of the apparatus shunted by a braking resistor 150 which is connected across its terminal through the normally closed contacts 128 of the starting relay RS. The rotor of the motor is supplied from the motor control unit.

The motor control unit includes a thyratron T having an anode 162, a cathode 164 and a control electrode 166. The anode 162 is connected to conductor L1 through the primary SP of a series transformer ST. The cathode is adapted to be connected to conductor L2 through the normally open contacts 130 of relay RS, the armature A of the motor and the switch S3. The thyratron T is supplied with control potential from the secondary SS of the transformer ST, a phase shift network PS, a variable bias network BL and the armature A. The secondary SS supplies a direct current potential in the control circuit through a rectifier RX1 and a fitting capacitor 166. A voltage divider 168 is connected across the capacitor 166. The phase-shift network PS is of the usual type including a capacitor 170 in series with a resistor 172 connected across the secondary AS of a transformer AT supplied from the conductors L1 and L2. The phase-shifted potential is derived from a variable resistor 174 connected between the junction of the capacitor 170 and the resistor 172 and an intermediate tap of the secondary AS. The biasing network BL is supplied from a capacitor 176 which is connected through a rectifier 178 across the conductors L1 and L2. The potential derivable from this network BL may be set by setting the variable resistor VR which is connected at one terminal to one plate of the capacitor 176 through a plurality of resistors 180, 182, 184, a pair of which 182 and 184 may be shunted out and at the other terminal to the other plate of the capacitor through a pair of resistors 186 and 188 one of which 188 may be shunted out. The control circuit of the thyratron T may be traced from the control electrode 166 through a grid resistor 190, a portion of the phase-shift resistor 174, a portion of the voltage divider 168 across the rectifier RX1, a portion of the variable resistor VR, the resistors 186 and 188 in series with the variable resistor VR, the conductor L2, the switch S3, the rotor A, the normally open contacts 130 of the relay RS to the cathode 164.

In the stand-by condition of the apparatus power is supplied to the conductors 111, 113 and 115 and L1 and L2 so that these conductors are energized. The trigger switch 201 on the gun is open so that the timer is in the deenergized, non-timing condition and relays RS, TD1 and TD2 are deenergized. Relay RW is then deenergized and there is no potential across the output conductors 122 and 124 of the power supply unit. Further, the solenoids SG and SW are deenergized so that the valves VG and VW are closed. With the water pressure adequate, switch WPS is closed.

When a welding operation is to be carried out, the electrode Z is threaded into the welding gun so that it extends to the open end of the adapter nozzle AN. The nozzle is then placed on the work and the trigger switch 201 is closed. This actuates the timer to start a timing operation immediately closing the contact 142 of the timer. The relay RS is then actuated, closing contacts 130 and connecting the armature A in circuit with thyratron T and energizing the motor M in accordance with the setting of VR. The movement of the electrode Z towards the work W is then started. In addition, relays TD1 and TD2 are energized, immediately closing their contacts 146 and 148. The closing of the contact of relay TD1 causes relay RW to be actuated so that potential is impressed between the electrode Z and the work. But initially the electrode is displaced from the work W and there is no current flow. In addition, at the now closed contact 146 of relay TD2 the solenoids SG and SW are energized, opening the water valve VW and the shielding gas valve VG so that both water and shielding gas are supplied. Thus, the advancing of electrode Z toward the work and the supply of shielding gas and cooling water start simultaneously and while the electrode is advancing toward the work, shielding gas flows, purging the gun gas channels and the surface of the work W of air. This purging action takes place while the electrode approaches the work and before there is an arc. The time taken by the electrode Z to move into contact with the work should be sufficiently long to assure complete purging and an effective shield before contact.

When the electrode Z finally contacts the work, an arc is fired between the electrode and the work. This arc continues to burn until the timer times out, opening its contact 142.

The timing out of the timer interrupts supply of current through relays RS, TD1 and TD2. Relay RS drops out immediately; the supply of current to the motor is interrupted and braking current is applied to the armature A so that the motor stops and the movement of the electrode Z is interrupted. The contacts of relays TD1 and TD2 remain closed for predetermined time intervals. Through the contacts 144 of relay TD1 and switch S2 relay RW remains actuated so that for the short time interval timed by relay TD1, there is a potential between the electrode Z and the work W and the electrode is burned back toward the nozzle. This prevents the electrode from sticking to the work, and in addition sets the electrode at the proper distance to assure effective repurging during the next weld. The contacts 146 of the relay TD2 remain closed for the time interval timed by this relay, and thus the cooling water and the gas continue to be supplied. The weld is thus post-purged by the gas and oxidation is prevented. After the post-purging operation, relay TD2 drops out and the apparatus may now produce another weld. In the usual practice of this invention the timer is so set that to produce a new weld the trigger 201 must be opened and reclosed.

Apparatus has been disclosed herein for producing arc-spot welding with a consumable electrode in a shield of gas. The apparatus disclosed can be used on clean or scaled, hot and cold rolled steel using Westinghouse MS–20 wire as a filler. Steel varying in thickness from 1/16" to 3/8" has been successfully plug welded. It has been found that in plug welding one-eighth inch thick scaly steel using a one-half inch hole tensile shear strength in excess of 4500 pounds per square inch for each spot were achieved. This compares with less than half this tensile shear strength for ordinary arc-spot welds of the overlap type, produced with a tungsten electrode without filler metal.

Aluminum sheet varying from 1/16" to 1/4" in thickness has also been successfully plug welded. It is also feasible to plug weld stainless steel over the range of thickness from 1/16" to 3/8".

It has further been found that in the welding of the plated materials, it is possible to use copper alloy or aluminum bronze filler wire and to plug weld successfully without any serious deterioration of the plated surfaces. Further, in plug welding it has been found feasible to control the filler wire so precisely that the finished weld is flush with or below the surface of the metals being joined in accordance with requirements. The apparatus disclosed herein is particularly suitable for plug welding at straight polarity. In welding of this type the penetration is low and difficulty is encountered in welding materials of substantial thickness. This difficulty is eliminated in plug welding because holes are provided in the material which may be filled to the extent derived by melting the electrode material for precisely predetermined intervals.

The apparatus disclosed here is applicable for welding of all types of material. Thus the apparatus may be used in welding material such as mild and low alloy steels, stainless steel, copper and copper alloys, aluminum and even dissimilar metal combinations.

One feature of this invention is that the facilities for arc-spot welding may be supplied as a separate attachment for an ordinary standard control. This attachment would include switches S1, S2, S3, the timer and time delay relays TD1 and TD2, and provisions for connecting the attachment to the standard control.

While certain preferred embodiments have been disclosed herein, many modifications thereof are feasible. This invention therefore is not to be restricted except as is necessitated by the spirit of the prior art.

We claim as our invention:

1. Arc welding apparatus for producing spot welds on work with a consumable electrode, comprising in combination means for advancing said electrode to said work, means adapted to cooperate with said electrode for impressing a potential between said electrode and said work to produce a welding arc therebetween, said arc being initiated when said electrode contacts said work with a potential impressed between said electrode and work, means adapted to cooperate with said electrode for supplying gas to shield said arc, first timing means for timing a first interval, second timing means for timing a second interval, third timing means for timing a third interval, means responsive to said first timing means and connected to said advancing means for actuating said advancing means to advance said electrode during said first interval, means responsive to said first timing means when it starts a timing operation and connected to said impressing means for actuating said impressing means to impress said potential between said electrode and said work, means responsive to said first timing means when it starts a timing operation and connected to said supply means to actuate said supply means to supply gas to shield said electrode and said work, the advancing of the electrode towards the work and the supply of gas being started substantially simultaneously, means responsive to said first timing means when it terminates a timing operation and connected to said second timing means to start the timing out of said second timing means, means responsive to said first timing means when it terminates a timing operation and connected to said third timing means to start the timing out of said third timing means, means responsive to said second timing means when it times out and connected to said impressing means for interrupting the impressing of said potential, and means responsive to said third timing means when it times out and connected to said gas supply means for interrupting the supply of said gas.

2. Arc welding apparatus for producing spot welds on work with a consumable electrode, comprising in combination means for advancing said electrode to said work, means adapted to cooperate with said electrode for impressing a potential between said electrode and said work to produce a welding arc therebetween, an arc being initiated between said electrode and work when said electrode contacts said work with a potential impressed between said electrode and work, means adapted to cooperate with said electrode for supplying gas to shield said arc, first timing means for timing a first interval, means responsive to said first timing means and connected to said advancing means for actuating said advancing means to advance said electrode during said first interval, means responsive to said first timing means when it starts a timing operation and connected to said impressing means for actuating said impressing means to impress said potential between said electrode and said work and for interrupting the impressing of said potential after said timing operation, and means responsive to said first timing means when it starts a timing operation and connected to said supplying means to actuate said supplying means to supply gas to shield said electrode and said work, and for interrupting the supply of said gas after said timing operation, the advancing of the electrode towards the work and the supply of gas being started substantially simultaneously.

3. Arc welding apparatus for producing spot welds on work with a consumable electrode comprising in combination means for advancing said electrode to said work, means adapted to cooperate with said electrode for impressing a potential between said electrode and said work to produce a welding arc therebetween, an arc being initiated between said electrode and said work when said electrode contacts said work with a potential impressed between said electrode and work, means adapted to cooperate with said electrode for supplying gas to shield said arc, first timing means for timing a first interval, second timing means for timing a second interval, means responsive to said first timing means and connected to said advancing means for actuating said advancing means to advance said electrode during said first interval, means responsive to said first timing means when it starts a timing operation and connected to said impressing means for actuating said impressing means to impress said potential between said electrode and said work, means responsive to said first timing means when it starts a timing operation and connected to said supplying means to actuate said supplying means to supply gas to shield said electrode and said work and for interrupting the supply of said gas after said timing operation, the advancing of the electrode towards the work and the supply of gas being started substantially simultaneously, means responsive to said first timing means when it terminates a timing operation and connected to said second timing means to start the timing out of said second timing means, and means responsive to said second timing means when it times out and connected to said impressing means for interrupting the impressing of said potential.

4. Arc welding apparatus for producing spot welds on work with a consumable electrode comprising in combination means for advancing said electrode to said work, means adapted to cooperate with said electrode for impressing a potential between said electrode and said work to produce a welding arc therebetween, an arc being initiated between said electrode and said work when said electrode contacts said work with a potential impressed between said electrode and work, means adapted to cooperate with said electrode for supplying gas to shield said arc, first timing means for timing a first interval, second timing means for timing a second interval, means responsive to said first timing means and connected to said advancing means for actuating said advancing means to advance said electrode during said first interval, means responsive to said first timing means when it starts a timing operation and connected to said impressing means for actuating said impressing means to impress said potential between said electrode and said work and for interrupting the impressing of said potential after said timing operation, means responsive to said first timing means when it starts a timing operation and connected to said supplying means to actuate said supplying means to supply gas to shield said electrode and said work, the advancing of the electrode towards the work and the supply of gas being started substantially simultaneously, means responsive to said first timing means when it terminates a timing operation and connected to said second timing means to start the timing out of said second timing means, and means responsive to said second timing means when it times out and connected to said gas supply means for interrupting the supply of said gas.

5. Arc welding apparatus for producing spot welds on work with a consumable electrode of stainless steel type, comprising in combination means for advancing said electrode to said work, means adapted to cooperate with said electrode for impressing a potential between said electrode and said work to produce a welding arc therebetween, an arc being initiated between said electrode and said work when said electrode contacts said work with a potential impressed between said electrode and work, means adapted to cooperate with said electrode for supplying gas to shield said arc, first timing means for timing a first interval, second timing means for timing a second interval, means responsive to said first timing means and connected to said advancing means for actuating said advancing means to advance said electrode during said first interval, means responsive to said first timing means when it starts a timing operation and connected to said impressing means for actuating said impressing means to impress said potential between said electrode and said work, means responsive to said first timing means when it starts a timing operation and connected to said supplying means to actuate said supplying means to supply gas to shield said electrode and said work, means responsive to said first timing means when it terminates a timing operation and connected to said second timing means to start the timing out of said second timing means, means responsive to said first timing means when it terminates a timing operation and connected to said third timing means to start the timing out of said third timing means, and means responsive to said second timing means when it times out and connected to said gas supply means for interrupting the supply of said gas.

6. Apparatus for arc welding work with a consumable electrode in a shield of gas comprising in combination means for advancing said electrode to said work, means to be connected to said electrode for impressing a potential between said electrode and said work, an arc being initiated between said electrode and said work when said electrode contacts said work, means for supplying gas to said work, and means connected to said supplying means and to said advancing means for actuating said advancing means and said supplying means simultaneously so that prepurge shielding gas flows while said electrode is advancing toward said work.

References Cited in the file of this patent

UNITED STATES PATENTS

| | | |
|---|---|---|
| 2,289,938 | Smith | July 14, 1942 |
| 2,428,849 | Kratz et al. | Oct. 14, 1947 |
| 2,510,205 | Baird | June 6, 1950 |
| 2,510,207 | Behnke et al. | June 6, 1950 |
| 2,510,415 | Pitcher | June 6, 1950 |
| 2,550,495 | Pilia | Apr. 24, 1951 |
| 2,583,665 | Pilia | Jan. 29, 1952 |
| 2,673,278 | Anderson | Mar. 23, 1954 |
| 2,717,948 | Cochrell et al. | Sept. 13, 1955 |
| 2,776,361 | Essig | Jan. 1, 1957 |
| 2,806,127 | Hackman | Sept. 10, 1957 |

FOREIGN PATENTS

| | | |
|---|---|---|
| 713,507 | Great Britain | Aug. 11, 1954 |

OTHER REFERENCES

"Welding Journal," September 1955, pp. 839–845.